United States Patent [19]
Chang et al.

[11] Patent Number: 5,548,731
[45] Date of Patent: Aug. 20, 1996

[54] SYSTEM FOR FORWARDING DATA PACKETS WITH DIFFERENT FORMATS TO DIFFERENT SOFTWARE ENTITLES RESPECTIVELY BASED UPON MATCH BETWEEN PORTION OF DATA PACKET AND FILTER

[75] Inventors: Kyusun Chang; Lon E. Hall; Gregory S. Joyce; Paul D. Mazzurana, all of Austin; Lance W. Russell, Fredericksburg, all of Tex.

[73] Assignee: International Business Machines Corporation, Armonk, N.Y.

[21] Appl. No.: 516,112

[22] Filed: Aug. 17, 1995

Related U.S. Application Data

[63] Continuation of Ser. No. 4,145, Jan. 13, 1993, abandoned.
[51] Int. Cl.$^6$ ............................ G06F 13/00; G06F 13/14; G06F 12/02
[52] U.S. Cl. .................... 395/280; 395/650; 395/800; 395/500; 364/222.2; 364/238; 364/280; 364/940.71
[58] Field of Search ................................... 395/821, 280, 395/650, 800, 500

[56] References Cited

U.S. PATENT DOCUMENTS

| | | | |
|---|---|---|---|
| 4,306,289 | 12/1981 | Lumley | 364/200 |
| 4,330,847 | 5/1982 | Kuseski | 364/900 |
| 4,400,778 | 8/1983 | Vivian et al. | 364/200 |
| 4,706,081 | 11/1987 | Hart et al. | 340/825.03 |
| 5,063,494 | 11/1991 | Davidowski et al. | 395/800 |
| 5,084,877 | 1/1992 | Netravali et al. | 371/32 |
| 5,088,032 | 2/1992 | Bosack | 395/200 |
| 5,096,480 | 3/1992 | Fenner | 370/94.1 |
| 5,202,983 | 4/1993 | Orita et al. | 395/600 |
| 5,206,951 | 4/1993 | Khoyi et al. | 395/650 |
| 5,249,292 | 9/1993 | Chiappa | 395/650 |
| 5,265,239 | 11/1993 | Ardolino | 395/500 |
| 5,278,978 | 1/1994 | Demers et al. | 395/600 |
| 5,327,544 | 7/1994 | Lee et al. | 395/500 |

OTHER PUBLICATIONS

"Dynamic Network Switch Tables", Ibm Technical Disclosure Bulletin, vol. 32, No. 10B, Mar. 1990, pp. 378–379.
"BSD Socket–Based Message Queue IPC System Implementation", IBM Technical Disclosure Bulletin, vol. 34, No. 9, Feb. 1992, pp. 168–173.
"Multiple Instances of a Device Driver in the Kernel", IBM Technical Disclosure Bulletin, vol. 32, No. 10B, Mar. 1990, pp. 382–383.
"Synchronous and Asynchronous Driver Modes", IBM Technical Disclosure Bulletin, vol. 28, No. 11, Apr. 1986, pp. 5058–5059.
Abstract of C. Torek, "A New Framework for Device Support in Berkeley Unix", UKUUG, UNIX—The Legend Evolves. Proceedings of the Summer 1990 UKUUG Conference, pp. 117–126.

*Primary Examiner*—Thomas C. Lee
*Assistant Examiner*—Rehana Perveen Krick
*Attorney, Agent, or Firm*—Wayne P. Bailey; Diana L. Roberts

[57] ABSTRACT

A common data link interface providing a framework for device drivers and data link providers. This interface allows multiple frameworks to coexist and share a single device driver. The common data link interface is framework independant and provides functions that are common to a plurality of frameworks. The common data link interface comprises three components, a network device driver, network demultiplexers, and network services. The network device driver provides a simple interface to network based devices that can be used by both the sockets IFNET and the streams DLPI data link layers. The network demultiplexor provides common data link receive functionality. Network services provides the remaining additional functionality required to bind the common data link interface together.

2 Claims, 6 Drawing Sheets

42 ~ `struct ndd *nddp;`
`error = ns_alloc("en0", &nddp);`

Step 1. Search for NDD with a name that matches request

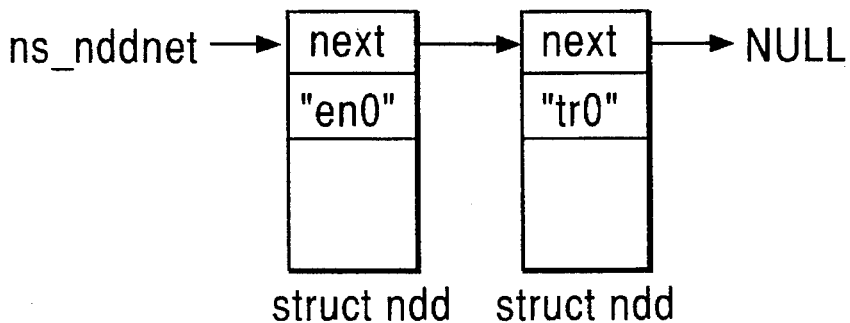

Step 2. If a match is found, check reference count

If reference count is zero call ndd_open function. The addresses of the demuxer receive and status functions are placed in the ndd structure at this time. These values are retrieved from the Network Demuxer for this type of NDD.

Step 3. If search and open are successful return a pointer to the ndd structure of the NDD.

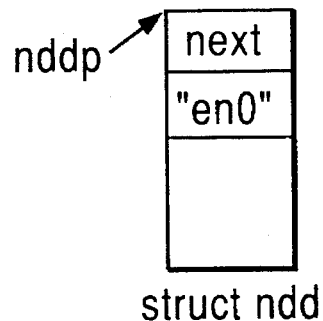

FIG. 5

Example of ns_add_filter

```
struct ns_8022 dl;          /* filter for 802.2 LANS */
struct ns_user ns_user;     /* describes the user */ dl.filtertype = NS_LLC_DSAP_SNAP;
dl.dsap = 0xaa:             /* interested in SNAP DSAP */
dl.orgcode[0] = 0x0;        /* org code = 000 */
dl.orgcode[1] = 0x0;
dl.orgcode[2] = 0x0;
dl.ethertype = 0x0800;      /* IP packets */
ns_user.isr = ipintr;
ns_user.protoq = &ipintrq;
ns_user.netisr = NETISR_IP;
ns_user.pkt_format = NS_PROTO_SNAP;
ns_add_filter(nddp, &dl, sizeof(dl), &ns_user);
```

Receive packet flow for a 802.3 LAN

Step 3. Find ns_user based on filter and deliver packet as specified by user

IP

ETHERNET NETWORK DEMUXER

Step 2. Parse packet to determine dsap and ethertype.

NDD Step 1. Receive packet from adapter. Pass on to network demuxer.

LAN

SYSTEM FOR FORWARDING DATA PACKETS WITH DIFFERENT FORMATS TO DIFFERENT SOFTWARE ENTITLES RESPECTIVELY BASED UPON MATCH BETWEEN PORTION OF DATA PACKET AND FILTER

This is a continuation of application Ser. No. 08/004,145 (now abandoned) filed Jan. 13, 1993.

TECHNICAL FIELD

This invention relates to data processing systems, and more particularly to a common interface for supporting a plurality of data frameworks.

BACKGROUND OF THE INVENTION

Various dissimilar data protocols have evolved in the data processing industry, each having various advantages/disadvantages in a particular application or use. For example, BSD provides networking code that uses a framework known as Sockets to implement a communication protocol compatible with Unix[1] operating systems. Numerous communication protocols have been written which are based on the Sockets framework, most notably TCP/IP. A framework is essentially a programming interface, or set of libraries which can be called by an application program, that provides data communication functions independant from the underlying protocol used to transfer the data. As such, various versions of a particular framework could provide support for different underlying protocols. For example, Sockets could support TCP/IP, SNA or ArcNet. Frameworks and protocols are further described in the IBM publication "AIX Version 3.2 Communication Programming Concepts", publication number SC23-2206-03, dated September 1992, and hereby incorporated by reference as background material.

[1]Trademark of Unix System Laboratories Inc.

AT&T introduced Streams as a framework to develop a Unix communication protocol. This Streams framework addressed some of the Sockets framework's shortcomings, Trademark of Unix System Laboratories, Inc. and has become popular in the data processing industry. Problems are encountered in that Sockets and Streams are completely independant frameworks. Thus, if a new communication protocol is desired to be added by an operating system provider, the provider must choose one or the other framework prior to the new protocol development. Providing support for multiple frameworks requires different hardware adapters and different device drivers corresponding to such hardware adapters.

This problem is further amplified when an operating system vendor is trying to provide a common operating system for a plurality of underlying data processing systems having differing processors, busses, etc. In this situation, the operating system provider would have dissimilar code support not only for the differing processors (e.g. an 80486, 68200 or RISC microprocessor), but for the differing frameworks and hardware adapters as well. This leads to larger development resource requirements, and an increase in hardware adapter requirements.

SUMMARY OF THE INVENTION

The Common Data Link Interface (CDLI) provides a framework for network device drivers and data link providers. This framework allows sockets and streams protocols to coexist and share a single device driver. The framework is socket/stream independent and only provides function that is common. General users interface indirectly to CDLI through sockets and DLPI (described below).

CDLI is composed of three components: Network Device Drivers, Network Demuxers, and Network Services. The Network Device Driver (NDD) model defines a lean, simple interface to network based devices that can be used by both the sockets IFNET and the streams Data Link Provider Interface (DLPI) data link layers. Common data link receive functionality is provided by a Network Demuxer. The demuxer specifies receive filters that will be used to distribute network packets. Network Services (NS) is a set of kernel functions that provides services to NDDs, Network Demuxers, and NS users(data links and protocols). NS is the glue that binds CDLI together.

In light of the foregoing, it is an object of the present invention to provide an improved data processing system.

It is a further object of the present invention to provide an improved data communication subsystem.

It is yet a further object of the present invention to provide a single hardware interface for supporting multiple communication frameworks.

It is still a further object of the present invention to provide a single driver interface to a hardware adapter which supports multiple communication frameworks.

These, and other, objects and features of the invention will become apparent from the following detailed description in which the preferred embodiment is set forth with reference to the accompanying drawing.

BRIEF DESCRIPTION OF THE DRAWING

FIG. 5 illustrates allocating the use of a network device driver in the CDLI system.

FIG. 6 illustrates adding a receive filter for input packets in the CDLI system.

DETAILED DESCRIPTION OF THE PREFERRED EMBODIMENT

Figure 1:
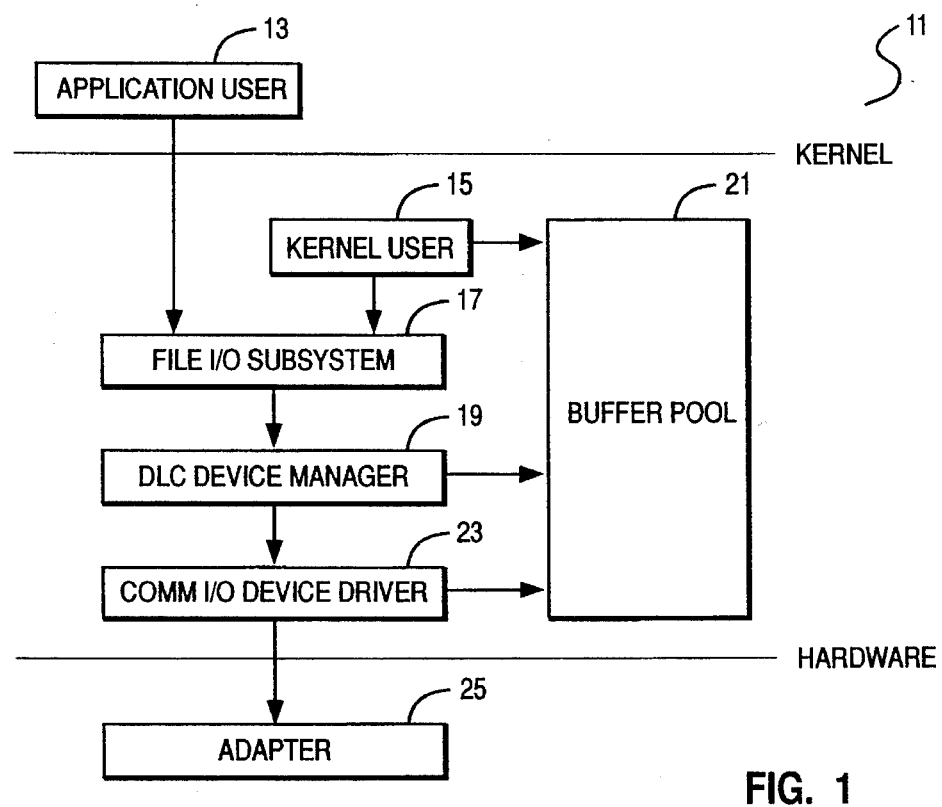
FIG. 1 depicts a traditional framework providing data link, or network, services using a generic programming interface.

FIG. 1 depicts a representative of a traditional generic data link control 11, or framework. The framework defines a generic interface definition that provides application 13 or kernel 15 users with a common set of commands to control a data link for the transfer of data. Users within the kernel at 15 have access to the communications memory buffers 21 and call the device driver (dd) entry points by way of the fp kernel services. Users above the kernel at 13 access the standard interface-to-kernel device drivers, and the file system calls the dd entry points. Data transfers generally require a move of data between user and kernel space. The application user 13 resides above the kernel as an application or access method. The kernel user 15 resides within the kernel as a kernel process of device manager. The file I/O subsystem 17 converts the file descriptor and file-pointer subroutines to file pointer(fp) accesses of a switch table (not shown). The DLC device manager 19 accesses the buffer pool in interfacing between the file I/O subsystem and the Comm I/O device driver. This device manager may support multiple user above, as well as multiple device drivers and adapters below. The buffer pool 21 provides data-buffer services for the communication subsystem. The Comm I/O device driver 23 controls hardware adapter I/O and DMA registers, and routes receive packets to the DLC device manager. The adapter 25 attaches to the communications media.

Figure 2:
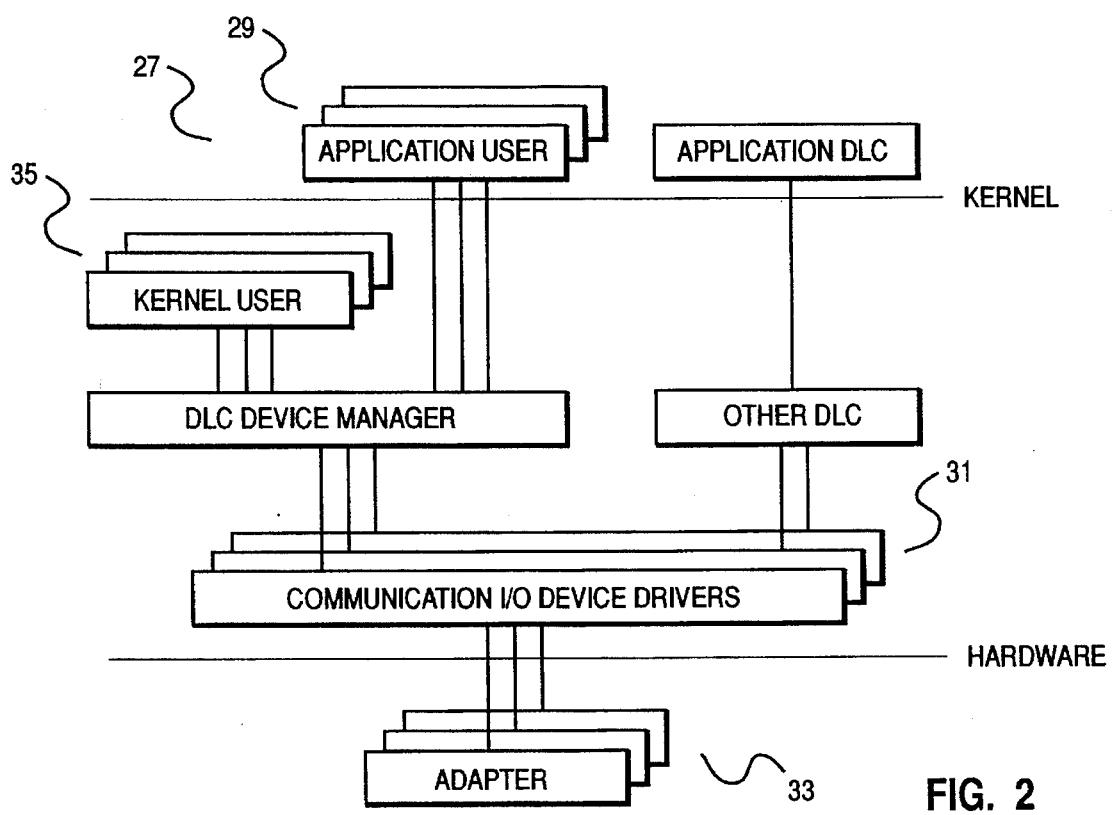
FIG. 2 depicts a traditional multi-user, multi-adapter configuration of that shown in FIG. 1.

A multi-user, multi-adapter configuration 27 is shown in FIG. 2, comprising multiple application users 29 and kernel users 35, along with multiple communication I/O device drivers 31 with corresponding adapters 33. This traditional approach suffers from requiring multiple I/O device drivers for differing frameworks.

The following describes common functions and how they are accomplished using the common data link interface of this invention. The functions generally occur in the following order.

Figure 3:
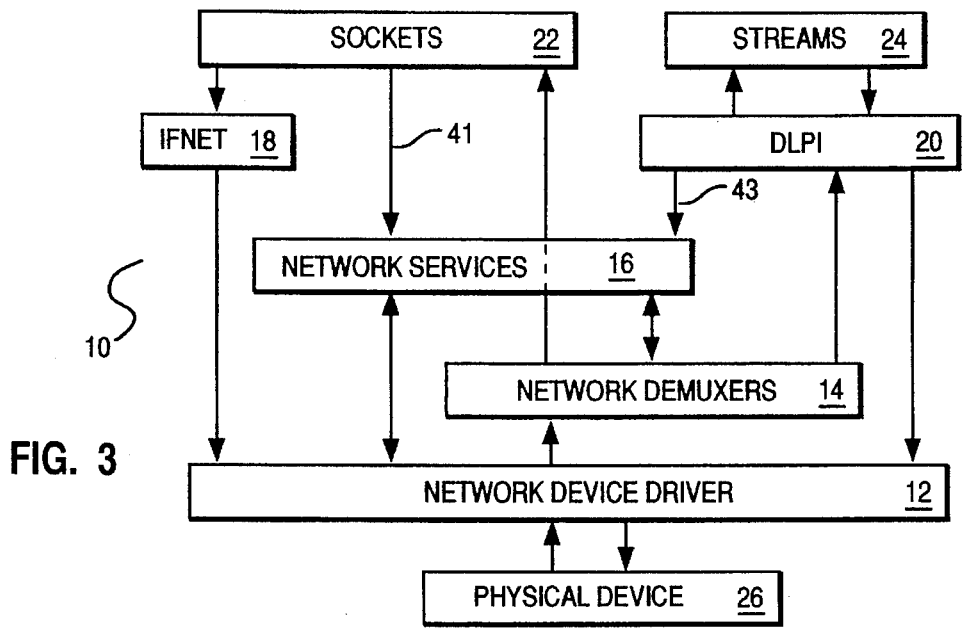
FIG. 3 is a overall system block diagram of a common data link interface (CDLI).

1—Adding a Network Demuxer
2—Adding a Network Device Driver
3—Allocating Use of a Network Device Driver
4—Adding a Receive Filter For Input Packets
5—Adding a Status Processing Function
6—Adding a Network Demuxer Adding a Network Demuxer Referring now to FIG. 3, Network demuxers 14 are responsible for routing both input packets and asynchronous status from a Network Device Driver (NDD) 12 to a NS user that has expressed interest (through ns_add_filter and ns_add_status). For instance, a demuxer for 802.2 LLC would use DSAP (and possibly ethertype) to determine which user will receive an input packet. The nd_add_filter and nd_del_filter (accessed through ns_add_filter and ns_del_filter) functions of a demuxer handle adding and removing receive filters. The demuxer 14 is responsible for keeping a list of filters and the associated users. After being configured, a Network Demuxer 14 makes itself available to the system by the ns_add_demux service.

The following table shows an example of a ns_add_demux service.

TABLE 1

```
struct ns_demuxer demuxer;
demuxer.use_nsdmx = TRUE;
demuxer.add_filter = eth_add_filter;
demuxer.del_filter = eth_del_filter;
demuxer.add_status = eth_add_status;
demuxer.del_status = eth_del_status;
demuxer.receive = eth_receive;
demuxer.status = eth_status;
demuxer.response = eth_response;
ns_add_demux(NDD_ETHER, &demuxer);
```

Adding a Network Device Driver

Figure 4:
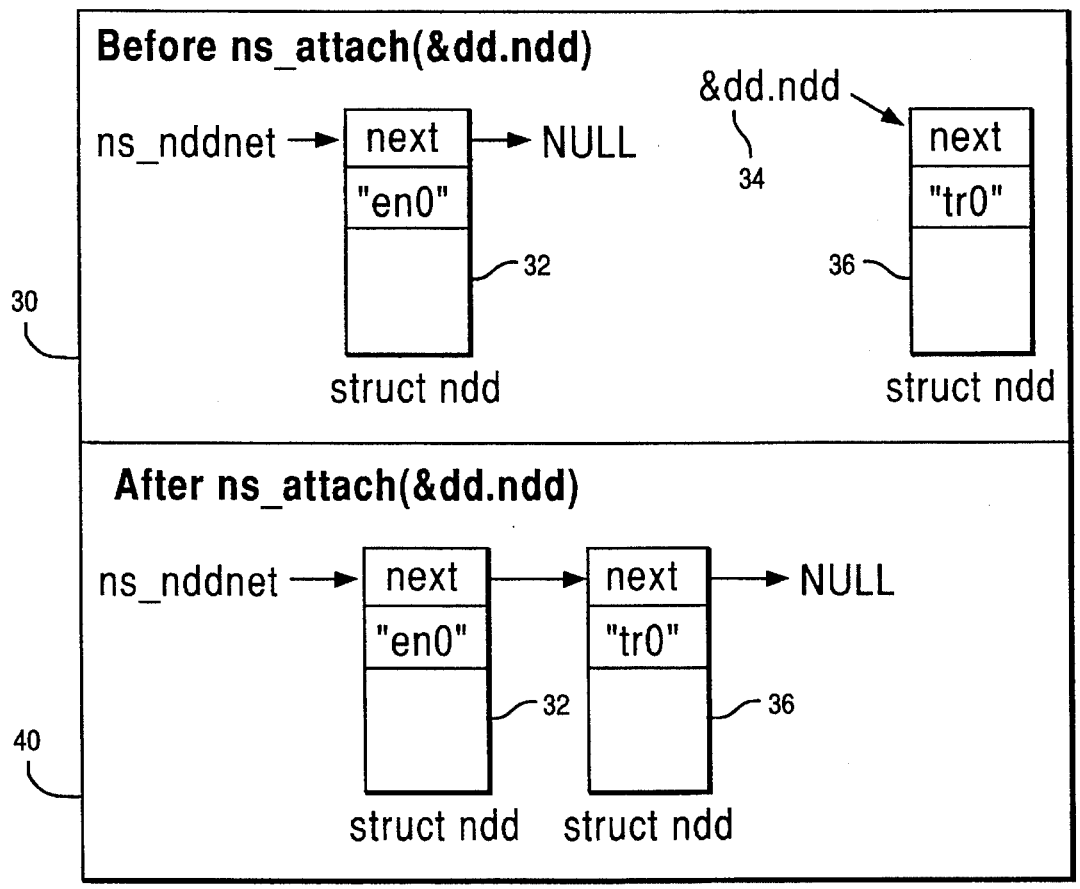
FIG. 4 illustrates adding a network device driver to the CDLI system.

After a Network Device Driver has been configured, it needs to make itself available to NDD users. This is accomplished by the ns_attach network service. This service adds the NDD to Network Service's list of available network device drivers. FIG. 4 illustrates this. As shown in the top block 30, an ndd structure 32 has the next ns_nddnet value pointing to NULL. A new network device as addressed by &dd.ndd 34 is to be added. This new network device has a data structure 36. The device driver's NDD is added to the list of available network device drivers, as shown in the ndd data structure ndd struct 32 of lower block 40. Block 40 shows the resultant data structure interrelations after having added a network device driver.

The ns_detach service is the opposite of ns_attach; that is it removes the network device from the list of available devices.

Allocating Use of a Network Device Driver

After a device driver has made itself available to the system (using ns_attach), it may be accessed by users. Device driver users gain access to a NDD through the ns_alloc network service. This service allocates use of the NDD (through a ndd structure 42 of FIG. 5) and opens the NDD if necessary. Access to the device is relinquished through the ns_free network service. The specific steps are shown and described in FIG. 5.

Adding a Receive Filter For Input Packets

In order to receive input packets (IP), a user must specify the type of packets in which it is interested in. For instance, IP would indicate that it would like ethertype 0x0800 packets. This registration is accomplished through the ns_add_filter network service. The Network Demuxer for the specified NDD will add the receive filter to it's list of filters and users. A filter is removed by the ns_del_filter service. The receive packet flow for an 802.3 local area network packet is shown and described in lower box 50 of FIG. 6. The filter structure is defined at 52, with the particular filter parameters for an 802.2 LAN shown at 60. The user is defined at 54.

Adding a Status Processing Function

If a user wishes to receive NDD status information it must register with the network demuxer. This registration is accomplished through the ns_add_status network service. The Network Demuxer for the specified NDD will add the status filter to it's list of filters and users. A status filter is removed by the ns_del_status service.

Using an Allocated Network Device Driver

Figure 7:
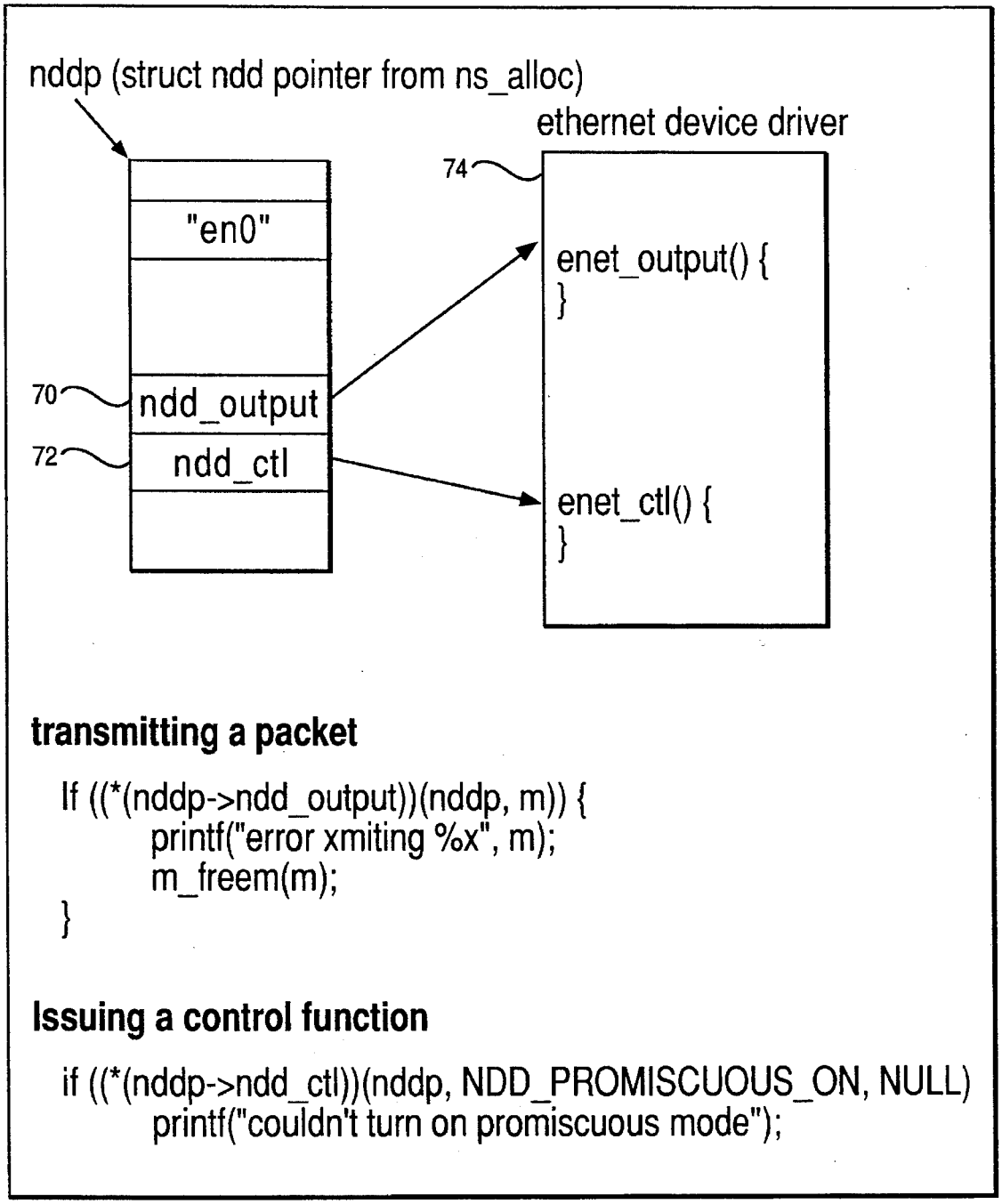
FIG. 7 illustrates using an allocated network device driver in the CDLI system.

Referring now to FIG. 7, after a NDD user has allocated a NDD with the ns_alloc service, it may use the nd_output 70 and ndd_ctl 72 functions of the NDD. ndd_output is used to transmit data to the associated device driver 74. Various device control and status functions for a particular hardware adapter are available through the ndd_ctl function. Sample code for transmitting a packet and issuing a control function is shown in the lower portion of FIG. 7.

Functional Interactions

Figure 8:
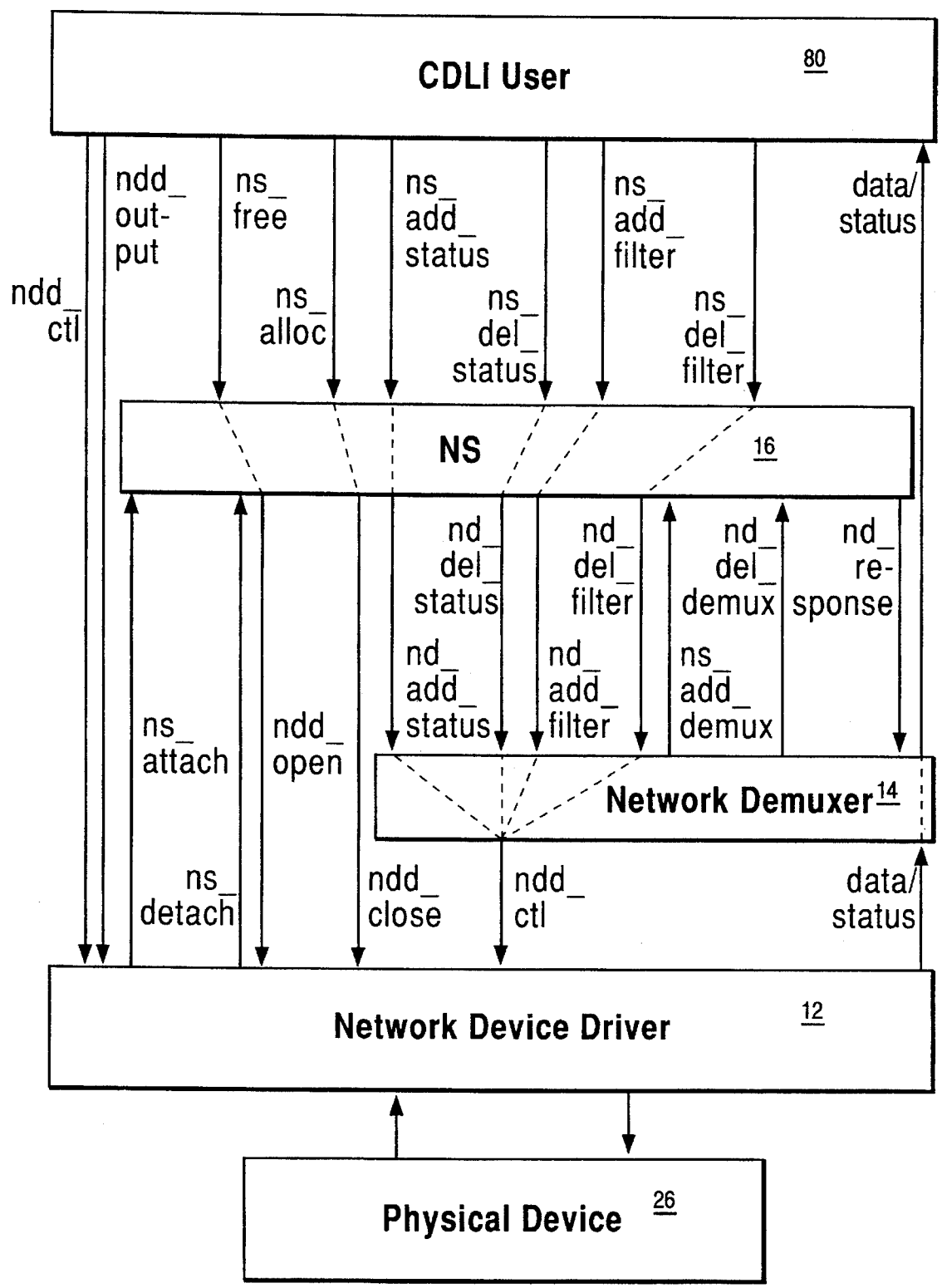
FIG. 8 illustrates the data/code flow in the CDLI system.

FIG. 8 depicts the interfaces and interplay between the network device driver 12, used to control physical device 26, and the network demuxer 14, network services 16, and a CDLI user 80. The CDLI user could be, for example, using the sockets framework 22 of FIG. 1, and thus the interface between the CDLI user 80 and network services 16 of FIG. 8 would be interface 41 of FIG. 1. Alternatively, the CDLI user could be using the streams framework 24 of FIG. 1, and thus the interface between the CDLI user 80 and network services of FIG. 8 would be interface 43 of FIG. 1. Each of the functions/routines shown in FIG. 8 will now be described.

Network Services Overview

The following routines provide various aspects of network services, as described by the definitions for the respective routines.

Network Services for users (sockets, DLPI)

ns_alloc
    Allocates use of the specified network device.

ns_free
  Relinquishes access to a network device.
ns_add_filter
  Adds a receive filter that enables the reception of packets that match the filter.
ns_del_filter
  Deletes a receive filter and disables reception of packets that match the filter.
ns_add_status
  Adds a filter for routing of asynchronous status.
ns_del_status
  Deletes a previously added status filter.

Network Services for network demuxers ns_add_demux
  Adds a demuxer for the specified type of network device.
ns_del_demux
  Removes a demuxer for the specified type of network device.

Network Services for network device drivers ns_attach
  Places a device into the available NS device chain.
ns_detach
  Removes a device from the available device chain.

The following provides detailed implementation information for implementing the above listed network service routines.

NAME ns_alloc
  Allocates use of a network device driver.

```
SYNOPSIS
    #include <sys/ndd.h>
    int ns_alloc ( nddname, nddpp)
        char        *nddname;
        struct ndd  **nddpp;
```

PARAMETERS nddname
  The device name to be allocated.
nddpp
  Address of pointer to a ndd structure.

DESCRIPTION

This network service will walk the NS device chain to find the device driver with the specified nddname. If a match is found, then the reference count for the specified device driver will be incremented. If the reference count is incremented to 1, then the ndd_open( ) routine specified in the ndd structure is called to open the device driver.

EXAMPLES struct ndd *nddp; error=ns_alloc("en0", &nddp);

RETURN VALUE

If a match is found and the open to the device is successful, a pointer to the ndd structure for the specified device is stored in nddpp. If no match is found or the open of the device is unsuccessful, then a non zero value is returned.

0—The operation was successful.
  ENODEV—Indicates an invalid network device.
  ENOENT—No network demuxer available for this device.
  Other return values from the open of the NDD.

FILES net/ns.c

RELATED INFORMATION

Interfaces: ns_free( ), ndd_open( )
Network Device Drivers

NAME ns_free
  Relinquishes access to a network device.

```
SYNOPSIS
    #include <sys/ndd.h>
    void ns_free ( nddp)
        struct ndd *nddp;
```

PARAMETERS nddp
  Specifies the ndd structure of the network device that is to be freed from use.

DESCRIPTION

This network service will decrement the reference count for the specified ndd structure. If the reference count becomes 0, then the ndd_close( ) routine specified in the ndd structure is called.

EXAMPLES struct ndd *nddp;
ns_free(nddp);

RETURN VALUE none

FILES net/ns.c

RELATED INFORMATION

Interface: ns_alloc( )
Network Device Drivers

NAME ns_add_filter
  Registers a receive filter to enable the reception of packets.

```
SYNOPSIS
    #include          <sys/cdli.h>
    int ns_add_filter ( nddp, filter, len, ns_user)
        struct ndd *nddp;
        caddr_t filter;
        int len;
        struct ns_user *ns_user;
```

PARAMETERS nddp
  Specifies the ndd that this add request is for.
filter
  Pointer to the receive filter.
len
  The length in bytes of the receive filter pointed to by the filter parameter.
ns_user
  Pointer to a ns_user structure that defines the user.

DESCRIPTION

The ns_add_filter network service is called to register a receive filter for the reception of packets. This enables a network demuxer to route packets to the appropriate users. The add request is passed on to the nd_add_filter function of the demuxer for the specified NDD. The caller of ns_add_filter is responsible for relinquishing filters before calling ns_free.

EXAMPLES struct ns_8022 dl; /* filter for 802.2 LANS */
struct ns_user ns_user; /* describes the user */
dl.filtertype=NS_LLC_DSAP_SNAP;
dl.dsap=0xaa;
dl.orgcode[0]=0x0;
dl.orgcode[1]=0x0;
dl.orgcode[2]=0x0;
dl.ethertype=0x0800;
ns_user.isr=ipintr;
ns_user.protoq=&ipintrq;
ns_user.netisr=NETISR_IP;
ns_user.pkt_format=NS_PROTO_SNAP;
ns_add_filter(nddp, &dl, sizeof(dl), &ns_user);

RETURN VALUE

0—The operation was successful.
ENODEV—Indicates an invalid network device.
ENOENT—No network demuxer available for this device.
Other return values from network demuxer.

FILES net/ns.c

RELATED INFORMATION

Interfaces: ns_del_filter( )
Network Demuxers

NAME ns_del_filter
  Deletes a receive filter.

```
SYNOPSIS
    #include <sys/cdli.h>
    int ns_del_filter ( nddp, filter, len)
        struct ndd      *nddp;
        caddr_t         filter;
        int             len;
```

PARAMETERS nddp
  Specifies the ndd that this delete request is for.
filter
  Pointer to the receive filter.
len
  The length in bytes of the receive filter.

DESCRIPTION

This network service will delete the receive filter from the corresponding network demuxer. This has the effect of disabling packet reception for packets that match the filter. The delete request is passed on to the nd_del_filter function of the demuxer for the specified NDD.

EXAMPLES struct ns_8022 dl; /* filter for 802.2 LANS */
dl.filtertype=NS_LLC_DSAP_SNAP;
dl.dsap=0xaa;
dl.orgcode[0]=0x0;
dl.orgcode[1]=0x0;
dl.orgcode[2]=0x0;
dl.ethertype =0x0800;
ns_del_filter(nddp, &dl, size of(dl));

RETURN VALUE

0—The operation was successful.
ENODEV—Indicates an invalid network device.
Other return values from Network Demuxer.

FILES net/ns.c

RELATED INFORMATION

Interfaces: ns_add_filter( ) and ns_alloc( )

NAME ns_add_status

Adds a status filter for the routing of asynchronous status.

```
SYNOPSIS
    #include <sys/cdli.h>
    int ns_add_status (nddp, statfilter, len,
    ns_statuser)
        struct ndd          *nddp;
        caddr_t             statfilter;
        int                 len;
        struct ns_statuser  *ns_statuser;
```

PARAMETERS nddp
  Pointer to the ndd structure that this add request is for.
statfilter
  Pointer the status filter.
len The length in bytes of statfilter.
ns_statuser
  Pointer to a ns_statuser structure that defines this user.

DESCRIPTION

The ns_add status network service is called to register a status filter. The add request is passed on to the nd_add status function of the demuxer for the specified NDD. This enables the user to receive asynchronous status information from the specified device.

NOTES

The user's status processing function will be called by the Network Demuxer when asynchronous status becomes available. The user's status processing function will be called directly, the status processing function can not be a scheduled routine.

EXAMPLES struct ns_statuser user;
struct ns_com_status filter;
filter.mask=NDD_HARD_FAIL;
filter.sid=0;
user.isr=status_fn;
user.isr_data=whatever_makes_sense;
error=ns_add_status(nddp, &filter, sizeof(filter), &user);

RETURN VALUE 0—The operation was successful.

ENODEV—Indicates an invalid device.
Other return values from the network demuxer.

FILES net/ns.c

RELATED INFORMATION

Interfaces: ns_del_status( )
Network Demuxers

NAME ns_del_status
Deletes a previously added status filter.

```
SYNOPSIS
    #include <sys/cdli.h>
    int ns_del_status (nddp, statfilter, len)
        struct ndd        *nddp;
        caddr_t           statfilter;
        int               len;
```

PARAMETERS nddp
    Pointer to the ndd structure that this delete request is for.
statfilter
    Pointer to the status filter.
len
    The length in bytes of statfilter.

DESCRIPTION

The ns_del_status network service is called to delete a previously added status filter from the corresponding network demuxer. The delete request is passed on to the nd_del_status function of the demuxer for the specified NDD. This has the effect of disabling asynchronous status notification from the specified device.

EXAMPLES

/* The filter parameter is the same as used in the ns_add_status call . */
error=ns_add_status(nddp. &filter. sizeof(filter));

RETURN VALUE

0—The operation was successful.
ENODEV—Indicates an invalid device.
EINVAL—Indicates an invalid parameter.
Other return values from the network demuxer.

FILES net/ns.c

RELATED INFORMATION

Interfaces: ns_add_status( )
Network Demuxers

NAME ns_add_demux
    adds a demuxer for the specified type of network interface.

```
SYNOPSIS
    #include <sys/ndd.h>
    #include <sys/cdli.h>
    int ns_add_demux ( ndd_type, demux)
        int              ndd_type;
        struct ns_demux *demux;
```

PARAMETERS ndd_type
    The interface type of the demuxer to be added.
demux
    Pointer to a ns demux structure that defines the demuxer.

DESCRIPTION

This network service adds the specified demuxer to the list of available network demuxers. There can only be one demuxer per network interface type. An interface type describes a certain class of network devices that have the same characteristics (ie ethernet, tokne ring). The ndd_type values listed in sys/ndd.h are the numbers defined by SNMP. If the desired type is not in ndd.h, the SNMP value should be used if it is defined. If not, any undefined type above NDD_MAX_TYPE may be used.

EXAMPLES struct ns_demux demuxer;
demuxer.add_filter=eth_add_filter;
demuxer.del_filter=eth_del_filter;
demuxer.add_status=eth_add_status;
demuxer.del_status=eth_del_status;
demuxer.receive=eth_receive;
demuxer.status=eth_status;
demuxer.response=eth_response;

ns_add_demux(NDD_IS088023, &demuxer);

RETURN VALUE

0—The operation was successful.
EEXIST—a demuxer already exists for the given type.
EINVAL—ndd_type out of range

FILES net/ns.c

RELATED INFORMATION

Network Demuxers, ns_del_demux( )

NAME ns_del_demux
   deletes a demuxer for the specified type of network interface.

SYNOPSIS include <sys/ndd.h>int ns_del_demux (ndd_type)
int ndd_type;

PARAMETERS ndd_type
   The network interface type of the demuxer that is to be deleted.

DESCRIPTION

If the demuxer is not currently in use, this network service will delete the specified demuxer from the list of available network demuxers. A demuxer is in use if a NDD is open for the demuxer.

EXAMPLES ns_del_demux(NDD_IS088023);

RETURN VALUE

0—The operation was successful.
ENOENT—The demux of the specified type does not exist.
EINVAL—ndd_type out of range
EBUSY—The demuxer is currently in use.

FILES net/ns.c

RELATED INFORMATION

Network Demuxers, ns_add_demux( )

NAME ns_attach
   Attaches a network device to the network subsystem.

SYNOPSIS include <sys/ndd.h>
int ns_attach (nddp)
struct ndd *nddp;

PARAMETERS nddp
   A pointer to a ndd structure describing the device to be attached.

DESCRIPTION

This network service is called to place the device into the available NS device chain. The NDD should be prepared to be opened after ns_attach is called.

NOTES

The ndd structure is allocated and initialized by the device. It should be pinned.

EXAMPLES

/* Example of adding a NDD during NDD configuration
   */
struct ndd ndd;
ndd.ndd_name="en";
ndd.ndd_unit=adap_num;
ndd.ndd_addrlen=6;
ndd.ndd_hdrlen=14;
ndd.ndd_mtu=ETHERMTU;
ndd.ndd_mintu=60;
ndd.ndd_type=NDD_ETHER;
ndd.ndd_flags=
NDD_UP [ N]DD_BROADCAST [ N]DD_SIMPLEX;
ndd.ndd_open=entopen;
ndd.ndd_output=entwrite;
ndd,ndd_ctl=entctl;
ndd.ndd_close=entclose;
ns_attach(&ndd);

RETURN VALUE

0—The operation was successful.
EEXIST—Indicates that the device is already in the available NS device chain.

FILES net/ns.c

RELATED INFORMATION

Interfaces: ns_detach( )

NAME ns_detach
   Removes a network device from the network subsystem.

SYNOPSIS include <sys/ndd.h>
int ns_detach (nddp)
struct ndd *nddp;

PARAMETERS nddp

A pointer to a ndd structure describing the device to be detached.

DESCRIPTION

This service removes the ndd structure from the chain of available NS devices.

EXAMPLES

```
/* nddp is address of previously attached ndd structure */
ns_detach(nddp);
```

RETURN VALUE

0—The operation was successful.
ENOENT—The specified ndd structure was not found.

FILES net/ns.c

RELATED INFORMATION

Interface: ns_attach( )

Network Demuxer Overview

A network demuxer provides functions for the routing of receive data and status information to the appropriate user(s). The demuxer must be able to interpret and route the different types of receive data that may be received from the interface. For example, a network demuxer for a FDDI interface (NDD type NDD_FDDI) would need to interpret MAC, SMT, implementor, and LLC frames. The FDDI demuxer would also be responsible for specifying the format of the receive filter (the criteria for demuxing input packets) that would be used in the ns_add_filter network service call.

A network demuxer registers with NS by means of the ns_add_demux network service.

There can only be one demuxer registered with NS per network interface type (as defined in <sys/ndd.h>).

A Network Demuxer consists of the following functions.
nd_config( )
  This optional entry point provides configuration functions for the demuxer.
nd_receive( )
  Routes received data to the appropriate NS user(s).
nd_status( )
  Distributes asynchronous status to the appropriate NS user(s). nd_add_filter( )
  Adds a receive filter for the routing of received data.
nd_del_filter( )
  Deletes a previously specified receive filter.
nd_add_status( )
  Adds a filter for routing of asynchronous status.
nd_del_status( )
  Deletes a previously added status filter.

The following provides detailed implementation information for implementing the above listed network demuxer routines.

NAME nd_config( )
Network Demuxer configuration

SYNOPSIS

```
#include <sys/cdli.h>
#include <sys/ndd.h>
int nd_config( op, indata, indatalen, outdata, outdatalen)
    sysconfig_op_t        op;
    nd_config_t *         indata;
    size_t                indatalen;
    nd_config_t *         outdata;
    size_t                outdatalen;
```

PARAMETERS op
  either SYSCONFIG_CONFIGURE or SYSCONFIG_UNCONFIGURE
indata
  demuxer configuration information
indatalen
  the length in bytes of indata
outdata
  returned configuration information
outdatalen
  the length in bytes of outdata

DESCRIPTION

This function provides configuration for Network Demuxers. SYSCONFIG_CONFIGURE will configure the demuxer into the system. The demuxer is removed by SYSCONFIG_UNCONFIGURE. The Network Demuxer type is contained in indata.

NOTES

SYSCONFIG_CONFIGURE should call the ns_add_demux network service to add the demuxer for the specified type of network interface. SYSCONFIG_UNCONFIGURE should call ns_del _demux to remove the demuxer.

RETURN VALUE

Return values of ns_add_demux and ns del demux

RELATED INFORMATION

Interfaces: ns_add_demux( ), ns_del_demux( ) OSF/1 System Extension Guide.

NAME nd_receive( )
Process receive data from a NDD.

SYNOPSIS

```
#include <sys/ndd.h>
#include <sys/mbuf.h>
void nd_receive( nddp, m)
    struct ndd *nddp;
    struct mbuf *m;
```

PARAMETERS nddp
  The address of the ndd structure from which the receive data originated.
m Pointer to a mbuf chain containing the received packet.

DESCRIPTION

This function will process the incoming data and route the data to the appropriate user. It must be capable of interpreting the different types of frames that may be received from the interface type. The network device driver passes all valid received frames (as indicated by the hardware) to the network demuxer receive function.

NOTES

The nd_receive( ) function must be interrupt safe. The first mbuf in the mbuf chain must be of M_PKTHDR format. The m_pkthdr.len field must be set to the total length of the packet. Multiple input packets may be passed to a demuxer by chaining with the m_nextpkt field of a mbuf. If the input packet(s) is not passed on to a user, the nd_receive function is responsible for freeing the buffers.

RETURN VALUE

There is no return value for this function.

RELATED INFORMATION

Network Device Drivers, mbuf services

NAME nd_status( )
Process status information from a NDD.

```
SYNOPSIS
    #include <sys/ndd.h>
    #include <sys/cdli.h>
    void nd_status ( nddp, status)
        struct ndd *nddp;
        ndd_stat_t *status;
```

PARAMETERS nddp
Specifies-the ndd structure for the device from which this status originated.
status
Pointer to a ndd_stat_t status block. The status block contains device specific information on the status event. The status block is defined in sys/ndd.h

DESCRIPTION

When a status event has occurred on a network device, the NDD builds the appropriate status block and calls the status function. This function is responsible for routing the status information to the appropriate user(s).

NOTES

The nd_status( ) function must be interrupt safe. The status block is passed by reference and is valid only for the duration of the call.

RETURN VALUE

There is no return value for this function.

RELATED INFORMATION

Network Demuxers

NAME nd_add_filter( )
Adds a receive filter for the specified device.

```
SYNOPSIS
    #include              <sys/ndd.h>
    #include              <sys/cdli.h>
    int nd_add_filter ( nddp, filter, len, ns_user)
        struct ndd *nddp;
        caddr_t filter;
        int len;
        struct ns_user *ns_user;
```

PARAMETERS nddp
Specifies the ndd structure of the device.
filter Points to the receive filter to be added. The format is demuxer dependent.
len
The length in bytes of the receive filter pointed to by the filter parameter. The demuxer must verify that the length is correct.
ns_user
Pointer to a ns_user structure describing this user.

DESCRIPTION

The nd_add_filter( ) function is called from the ns_add_filter network service call. The nd_add_filter( ) routine will add the specified receive filter to the list of possible receive patterns. Following this the NDD ndd_ctl function will be called with the NDD_ADD_FILTER operation and the value specified in the filter parameter.

RETURN VALUE

0—The operation was successful.
EEXIST—Receive filter is already in use.
EINVAL—Receive filter is invalid.
Other demuxer dependent return values.

RELATED INFORMATION

Interfaces: ns_add_filter( )

NAME nd_del_filter( )
Deletes a receive filter for the specified device.

```
SYNOPSIS
    #include              <sys/ndd.h>
    #include              <sys/cdli.h>
    int nd_del_filter ( nddp, filter, len)
        struct ndd *nddp;
        caddr_t filter;
        int len;
```

PARAMETERS nddp
Specifies the ndd structure of the device for this delete request.
filter
Points to the receive filter to be deleted. The format is demuxer dependent.

len
  The length in bytes of the receive filter pointed to by the filter parameter. The demuxer must verify that the length is correct.

DESCRIPTION

The nd_del_filter( ) is called from the ns_del_filter network service call. The nd_*del*_filter( ) routine will remove the specified receive filter from the list of possible receive patterns. Following this the NDD ndd_ctl function will be called with the NDD_DEL_FILTER operation and the value specified in the filter parameter.

RETURN VALUE

0—The operation was successful.
EINVAL—Indicates an invalid receive filter.
Other demuxer dependent return values.

RELATED INFORMATION

Interfaces: ns_del_filter( ) and ns_add_demux( )

NAME nd_add_status( )
  Adds a status processing function for the specified device.

```
SYNOPSIS
    #include         <sys/ndd.h>
    #include         <sys/cdli.h>
    int nd_add_status ( nddp, statfilter, len,
    ns_statuser)
        struct ndd *nddp;
        caddr_t statfilter;
        int len;
        struct ns_statuser *ns_statuser;
```

PARAMETERS nddp Specifies the ndd structure of the device for this add request.
statfilter
  Points to the status filter to be added. The format is demuxer dependent.
len
  The length in bytes of the status filter pointed to by the statfilter parameter.
ns_statuser
  Pointer to a ns_statuser structure describing this user.

DESCRIPTION

The nd_add_status( ) function is called from the ns_add_status network service call. The nd_add_status( ) routine will add the specified status filter to the list of status processing functions. Following this the NDD ndd_ctl function will be called with the NDD_ADD_STATUS operation and the value specified in the filter parameter.

RETURN VALUE

0—The operation was successful.
EINVAL—Status filter is invalid.
Other demuxer dependent return values.

RELATED INFORMATION

Interfaces: ns_add_status( )

NAME nd_del_status( )
  Deletes a status filter for the specified device.

```
SYNOPSIS
    #include         <sys/ndd.h>
    #include         <sys/cdli.h>
    int nd_del_status ( nddp, statfilter, len)
        struct ndd *nddp;
        caddr_t statfilter;
        int len;
```

PARAMETERS nddp
  Specifies the ndd structure of the device for this add request.
statfilter
  Points to the status filter to be added. The format is demuxer dependent.
len
  The length in bytes of the status filter pointed to by the statfilter parameter.

DESCRIPTION

The nd_del_status( ) function is called from the ns_del_status network service call. The nd_del_status( ) routine will use the specified status filter to remove the caller's status processing function. Following this the NDD ndd_ctl function will be called with the NDD_DEL_STATUS operation and the value specified in the filter parameter.

RETURN VALUE

0—The operation was successful.
EINVAL—Invalid parameter.
Other demuxer dependent return values.

RELATED INFORMATION

Interfaces: ns_del_status( )

NAME nd_response( )
  Build and send a response frame for an 802.2 LLC XID or TEST request.

```
SYNOPSIS
    #include <sys/ndd.h>
    #include <sys/mbuf.h>
    void nd_response ( nddp, m, llcoffset)
        struct ndd      *nddp;
        struct mbuf     *m;
        caddr_t         llcoffset;
```

PARAMETERS nddp
  The address of the ndd structure that the response should be sent on.
m Pointer to a mbuf chain containing the XID or TEST packet.
llcoffset Offset of start of 802.2 LLC header.

DESCRIPTION

This function will process the incoming XID or TEST request by doing and MAC level processing. For instance, an 802.3 demuxer would have to reverse the source and destination fields in the 802.3 header. The caller of this function must have already done any 802.2 XID/TEST processing. After processing the packet, this function should call the ndd_output function of the specified NDD.

NOTES

The nd_response( ) function must be interrupt safe. The first mbuf in the chain must be of M_PKTHDR format. The m_pkthdr.len field must be set to the total length of the packet. Multiple packets may not be passed to this function by chaining with the m_nextpkt field of a mbuf. If an error occurs the mbuf is freed and no response frame is transmitted.

RETURN VALUE

There is no return value for this function.

RELATED INFORMATION

Network Device Drivers

Network Device Driver Overview

A Network Device Driver (NDD) provides functions for transmitting data to and receiving data from the physical hardware. User applications interface to network devices by way of sockets or streams. A NDD consists the following entry point and functions.

ndd_config—provides configuration functions.

ndd_open—allocates system resources and initializes the device for reading and writing of data.

ndd_close—resets the device to a known state and frees system resources.

ndd_output—provides the means for transmitting data.

ndd_ctl—various functions for controlling the device.

A NDD also interfaces to a demuxer through the following functions.

nd_rcv—this function conforms to the syntax of the nd_receive function of a network demuxer nd_stat—this function conforms to the syntax of the nd_status function of a network demuxer.

At the completion of configuration, the ns_attach network service is called to place the specified device into the available NS device chain. The call to ns_attach may be deferred until the required microcode, routing table, or other information is loaded.

Before the completion of termination, the ns_detach network service is called to remove the specified device from the available NS device chain.

The following provides detailed implementation information for implementing the above listed network device driver routines.

NAME ndd_open function opens the specified device.

SYNOPSIS

```
#include <sys/ndd.h>
int ndd_open ( nddp)
    struct ndd *nddp;
```

PARAMETERS nddp
Pointer to the ndd structure of the device that this open request is for.

DESCRIPTION

When the ndd_open( ) function is called, the device driver should allocate any necessary system resources and attach the device to the network. Only one open is supported per device. The Network Demuxer receive and status functions are placed in the ndd structure by NS prior to this call.

NOTES

Transmitting and receiving data using the device can only be performed after the ndd_open( ) function has successfully completed. At open time Network Device Drivers (NDDs) will do any necessary initialization in order to attach to the network. The NDD will block for a "reasonable" amount of time waiting for initialization to complete. A reasonable amount of time is adapter specific. For ethernet it may be one second while token ring may be one minute. If this time limit is reached, the NDD will set the NDD_UP flag and return success to the caller. When initialization finally completes, asynchronous status will be sent to indicate the open has completed. The NDD_RUNNING flag will also be set in the ndd_flags field of the ndd structure. Only hard open errors are returned. If the connection fails for an asynchronous open, the NDD_UP flag is turned off. The ndd_open function is only called from the ns_alloc network service.

RETURN VALUE

0—The operation was successful.

EBUSY—Device is already open.

ENOMEM—Unable to allocate required memory.

ENODEV—Invalid device.

ENOCONNECT—Indicates that open failed, unable to connect to the network.

RELATED INFORMATION ndd_close( ) function

NAME ndd_close function
Closes the specified device.

SYNOPSIS

```
#include <sys/ndd.h>
int ndd_close( nddp)
    struct ndd *nddp;
```

PARAMETERS nddp
   Pointer to the ndd structure of the device to be closed.

DESCRIPTION

When the ndd_close( ) function is called, the device driver detaches the specified device from the network and frees previously allocated system resources. The device will not be detached from the network until the device's transmit queue is allowed to drain. That is, ndd_close( ) will not return until all packets have been transmitted. If the device is inoperable at the time of the close, the device's transmit queue does not have to be allowed to drain. The NDD is responsible for freeing any buffers that are in it's possession at the time of the ndd_close( ). This function resets the device to a known state.

NOTES

The ndd_close function is only called from the ns_free network service.

RETURN VALUE

0—The operation was successful.

RELATED INFORMATION ndd_open( ) function

NAME ndd_output function
   Outputs data to the specified network device.

SYNOPSIS

```
#include        <sys/ndd.h>
#include        <sys/mbuf.h>
int ndd_output(nddp, m)
     struct ndd     *nddp;
     struct mbuf    *m;
```

PARAMETERS nddp
   Address of the ndd structure of the device.
m
   A mbuf pointer of the packet(s) to be transmitted.

DESCRIPTION

The ndd_output( ) function is called by a NS user to transmit data onto the network. Transmit data is passed in mbufs. On successful write requests, the NDD is responsible for freeing all the buffers associated with the request. If the call to ndd_output fails, the NDD will not free the mbuf. If any of the chained packets can be transmitted, the write is considered successful and the NDD is responsible for all mbufs in the chain.

NOTES ndd_output( ) must be interrupt safe and cannot block. The first mbuf in the mbuf chain must be of M_PKTHDR format and the m_pkthdr.len field must be set to the total length (in bytes) of the packet. Multiple packets may be chained by using the m_nextpkt field of a mbuf.

RETURN VALUE

0—the transmit was successful
EAGAIN—The transmit queue is full.
ENETDOWN—The network is permanently down.
ENETUNREACH—Network is temporarily unreachable.

RELATED INFORMATION ndd_open( ) function, mbuf services

NAME ndd_ctl function
   provides device control functions

SYNOPSIS

```
#include <sys/ndd.h>
int ndd_ctl ( nddp, cmd, arg, len)
     struct ndd *nddp;
     int cmd;
     caddr_t arg;
     int len;
```

PARAMETERS nddp Address of the ndd structure of the device.
cmd
   Specifies the control operation to be performed. The commands are described below.
arg
   Specifies the address of the control parameter block. The format is command specific.
len
   Length (in bytes) of the arg parameter.

DESCRIPTION

NDD_GET_STATS
   Retrieves generic and device specific statistics. arg is the address of a buffer in which statistics will be returned.
NDD_ENABLE_ADDRESS
   Enables reception of packets with an alternate address (e.g., multicast). arg points to the multicast address to be enabled. The format of arg is specific to a NDD type. The NDD_ALTADDRS flag should be set in the ndd_flags field.
NDD_DISABLE
—ADDRESS
   Disables the receipt of an alternate address. The arg parameter points to the address to be disabled. The format of arg is specific to a NDD type. The NDD_ALTADDRS flag should be reset in the ndd_flags field of the ndd structure if this is the last alternate address.
NDD_PROMISCUOUS_ON
   Turns on promiscuous mode for devices that support it.
NDD_PROMISCUOUS OFF
   Terminates promiscuous mode.
NDD_ADD_FILTER
   This command is for use by devices that support hardware level filtering. The arg parameter points to the receive filter (e.g., sap) to be added to the filter list. The format of the filter is device type specific. The format of arg is specific to a NDD type.
NDD_DEL_FILTER
   Removes a previously added filter from the hardware filter list. The arg parameter points to the filter to be removed. The format of arg is specific to a NDD type.

NDD_*MIB*_SET

Set MIB(s) on the specified device. The arg parameter specifies the address of the ndd_mib_acc structure which contains the following fields: length: total length in bytes of ndd_mib_set parameter.

ndd_mib_set
  count—the number of MIB variables to set.
The following fields are repeated "count" times.
  mib—the MIB variable to set.
  status—return status from the set operation. Values are defined in sys/ndd.h.
  mib_len_length in bytes of the mib_value field.
  mib_value—value of the MIB variable to be set.

NDD_MIB_QUERY

Determines which device specific MIBs are supported. The arg parameter points to a ndd_mib_acc structure.
length
  total length in bytes of ndd_mib_query
ndd_mib_query
  Pointer to device specific MIB structure. This portion of the structure will be filled with flags indicating the level of support for each MIB variable. These flags are defined in sys/ndd.h.

NDD_MIB_GET

Retrieves the values of all MIBs on the specified device. The arg parameter points to a ndd_mib_acc structure.
length
  total length in bytes of ndd_mib_get
ndd_mib_get
  Pointer to device specific MIB structure.

NDD_ENABLE_MULTICAST

Enables reception of all multicast packets. The NDD_MULTICAST flag should be set in the ndd_flags field of the ndd structure.

NDD_DISABLE_MULTICAST

Disables the receipt of all multicast packets. The NDD_MULTICAST flag should be reset in the ndd_flags field of the ndd structure.

NOTES

All device drivers conforming to the NDD Interface must recognize, but not necessarily support, each of the above command operations. Additional control operations may be specified by the individual NDD as required.

The ndd_ctl( ) function must be interrupt safe. It must also maintain reference counts on control operations that require it (ex set promiscuous).

Privilege checks are not required of this function. They are done at a higher level.

RETURN VALUE

0—success
EOPNOTSUPP—The cmd is not supported.
EINVAL—An invalid parameter was specified.
ENETUNREACH—The network is currently unreachable.
ENETDOWN—The network is permanently down.

Common Demuxer Services Overview

Common Demuxer Services provide common functions so that Network Demuxers may be created more easily. These services consists of the following functions.

dmx_8022_receive( )
  Routes received 802.2 LLC data to the appropriate user(s).
dmx_status( )
  Distributes asynchronous status to the appropriate user(s).
dmx_8022_add_filter( )
  Adds a 802.2 receive filter for the routing of received data.
dmx_8022_del_filter( )
  Deletes a previously specified 802.2 receive filter.
dmx_add_status( )
  Adds a filter for routing of asynchronous status.
dmx_del_status( )
  Deletes a previously added status filter.

The following provides detailed implementation information for implementing the above listed common demuxer service routines.

NAME dmx_8022_receive( )
Process receive data from a NDD.

SYNOPSIS

```
#include <sys/ndd.h>
#include <sys/mbuf.h>
void dmx_8022_receive(nddp, m, llcoffset)
    struct ndd *nddp;
    struct mbuf *m;
    int llcoffset;
```

PARAMETERS nddp
  The address of the ndd structure from which the receive data originated.
m
  Pointer to a mbuf chain containing the received packet.
llcoffset
  Specifies the offset in bytes to the 802.2 LLC header.

DESCRIPTION

This function will process incoming 802.2 data and route the data to the appropriate user. Routing of data is accomplished by using 802.2 filters that have previously been added through the ns_add_filter and dmx_8022_add filter Network Services.

NOTES

The dmx_8022_receive( ) function must be interrupt safe. The first mbuf in the chain must be of M_PKTHDR format. The m_pkthdr.len field must be set to the total length of the packet. Multiple input packets may not be passed to a demuxer by chaining with the m_nextpkt field of a mbuf. If the input packet(s) is not passed on to a user, the dmx_8022_receive function will free the buffers.

RETURN VALUE

There is no return value for this function.

RELATED INFORMATION

Network Device Drivers

NAME dmx_status( )

Process status information from a NDD.

---
SYNOPSIS

```
#include <sys/ndd.h>
#include <sys/cdli.h>
void dmx_status(nddp, status)
       struct ndd *nddp;
       struct ndd_statblk *status;
```
---

PARAMETERS nddp
  Specifies the ndd structure for the device from which this status originated.
status
  Pointer to a ndd statblk status block. The status block contains device specific information on the status event. The status block is defined in sys/ndd.h.

DESCRIPTION

The dmx_status Network Service is called from a Network Demuxer's status function. It is responsible for routing the status information to the appropriate user(s).

NOTES

The dmx_status( ) function must be interrupt safe. The status block is passed by reference and is valid only for the duration of the call.

RETURN VALUE

There is no return value for this function.

RELATED INFORMATION

Network Demuxers

NAME dmx_8022_add_filter( )
  Adds an 802.2 receive filter for the specified device.

---
SYNOPSIS

```
#include      <sys/ndd.h>
#include      <sys/cdli.h>
int dmx_8022_add_filter (nddp, filter, ns_user)
       struct ndd *nddp;
       struct ns_8022 *filter;
       struct ns_user *ns_user;
```
---

PARAMETERS nddp
  Specifies the ndd structure of the device.
filter
  Points to the 802.2 receive filter to be added.
ns_user
  Pointer to a ns_user structure describing this user.

DESCRIPTION

The dmx_8022_add_filter( ) function is called from a Network Demuxer's add filter function. The routine will add the specified 802.2 LLC receive filter to the list of possible receive patterns.

RETURN VALUE

0—The operation was successful.
ENOMEM—Unable to allocate the required resources.
EEXIST—Receive filter is already in use.
EINVAL—Receive filter is invalid.

RELATED INFORMATION

Interfaces: ns_add_filter( )

NAME dmx_8022_del_filter( )
  Deletes an 802.2 LLC receive filter for the specified device.

---
SYNOPSIS

```
#include         <sys/ndd.h>
#include         <sys/cdli.h>
int dmx_8022_del_filter (nddp, filter)
       struct ndd *nddp;
       struct ns_8022 *filter;
```
---

PARAMETERS nddp
  Specifies the ndd structure of the device for this delete request.
filter
  Points to a ns_8022 structure that specifies the receive filter to be deleted.

DESCRIPTION

The dmx_8022_del_filter( ) service is called from a Network Demuxer's delete filter function. It will delete the specified 802.2 LLC receive filter from the list of possible receive patterns.

RETURN VALUE

0—The operation was successful.
ENOENT—The specified filter was not found.
EINVAL—Indicates an invalid receive filter.

RELATED INFORMATION

Interfaces: ns_del_filter( )

NAME dmx_add_status( )
  Adds a status processing function for the specified device.

---
SYNOPSIS

```
#include         <sys/ndd.h>
#include         <sys/cdli.h>
int dmx_add_status (nddp, statfilter, ns_statuser)
       struct ndd *nddp;
       struct ns_com_status *statfilter;
       struct ns_statuser *ns_statuser;
```
---

PARAMETERS nddp

Specifies the ndd structure of the device for this add request.

statfilter

Points to the status filter to be added.

ns_statuser

Pointer to a ns statuser structure describing this user.

DESCRIPTION

The dmx_add_status( ) function is called from a Network Demuxer's add status function. It will add the specified ns_com_status filter to the list of status processing functions. The dmx_status service will use the status filter when determining if a status user should be called to process a status event.

RETURN VALUE

0—The operation was successful.
ENOMEM—Unable to allocate required resources.
EINVAL—Status filter is invalid.

RELATED INFORMATION

Interfaces: ns_add_status( )

NAME dmx_del_status( )

Deletes a status filter for the specified device.

SYNOPSIS

```
#include        <sys/ndd.h>
#include        <sys/cdli.h>
int dmx_del_status (nddp, statfilter)
        struct ndd *nddp;
        struct ns_com_status *statfilter;
```

PARAMETERS nddp

Specifies the ndd structure of the device for this add request.

statfilter

Points to the status filter to be added.

DESCRIPTION

The dmx_del_status( ) function is called from a Network Demuxer's delete status function. It will delete the specified ns_com_status filter from the list of status processing functions. The sid field of the ns_com_status structure will be used to remove the proper status filter. Because of this users of the common status functions must save the status filter from the dmx_add_status call.

RETURN VALUE

0—The operation was successful.
ENOENT—The specified filter was not found.
EINVAL—Invalid parameter.

RELATED INFORMATION

Interfaces: ns_del_status( )

The following data structure definitions are used in conjunction with the above described routines for enabling the common data link interface.

NAME ndd—Defines a Network Device Driver

SYNOPSIS

```
#include <sys/ndd.h>
struct ndd {
        struct          ndd *ndd_next;
        u_int           ndd_refcnt;
        char            *ndd_name;
        u_short         ndd_unit;
        u_long          ndd_flags;
        caddr_t         ndd_correlator;
        /* procedure handles */
        int             (*ndd_open) ( );
        int             (*ndd_close) ( );
        int             (*ndd_output) ( );
        int             (*ndd_ctl) ( );
        /* user receive and status functions */
        void            (*nd_receive) ( );
        void            (*nd_status) ( );
        /* driver description */
        u_long          ndd_mtu;
        u_long          ndd_mintu;
        u_char          ndd_type;
        u_char          ndd_addrlen;
        u_char          ndd_hdrlen;
        caddr_t         ndd_physaddr;
        /* stats */
        struct ndd_genstats        ndd_genstats;
        caddr_t ndd_specsats;
        caddr_t ndd_speclen;
        struct ns_demuxer          *ndd_demuxer;
        struct ns_dmx___ctl        *ndd_nsdemux;
        caddr_t ndd_specdemux;
};
```

FIELDS ndd_next

A pointer to the next NDD in the available NDD chain. This field should only be modified by the ns_attach and ns_detach network services.

ndd_refcnt

A counter of the number of outstanding ns_alloc's for the NDD. The ns_alloc network service will increment this counter while the ns_free service will decrement it.

ndd_name

The name of this NDD, e.g., "en".

ndd_unit

Used to identify a specific device of the same type. An ethernet NDD could have a name of "en" and units of 0 and 1 if there are two adapters in the system. Users of the NDD would then reference the adapters with names of "en0" and "en1"

ndd_flags

Describes device state and characteristics. All these flags are set by the NDD. NDD_RUNNING, NDD_DEAD, and NDD_LIMBO are mutually exclusive.

NDD_UP

Set when a NDD is successfully opened. If an asynchronous open later fails, this flag should be reset.

NDD_RUNNING

The NDD has been opened and is operational.

NDD_DEAD

The adapter is not operative.

50

NDD_$_{LIMBO}$

The NDD is attempting to recover from a device error.

NDD_BROADCAST

This adapter has media broadcast capability.

NDD_SIMPLEX
    The adapter can not hear it's own transmissions.
NDD_DEBUG
    The NDD is operating in debug mode.
NDD_PROMISC
    The adapter is in promiscuous mode.
NDD_ALTADDRS
    Adapter is receiving alternate addresses (e.g., multicast).
NDD_MULTICAST
    Adapter is receiving all multicast addresses.
ndd_correlator
    The field can be used by a NDD to correlate to an internal control structure.
ndd_open
    The address of the open function of the NDD.
ndd_close
    The address of the close function of the NDD.
ndd_output
    The address of the packet transmit function of the NDD.
ndd_ctl
    The address of the device control function of the NDD.
ndd_rcv
    A pointer to a demuxer receive function. A NDD will call this function when a packet is received. This field is initialized by the ns_alloc network service.
ndd_star
    A pointer to a demuxer status function. A NDD will call this function when asynchronous status is available. This field is initialized by the ns_alloc network service.
ndd_mtu
    The maximum packet size that can be transmitted.
ndd_mintu
    The minimum packet size that can be transmitted.
ndd_type
    The media type of the NDD, (e.g., NDD_FDDI for a FDDI NDD). If an ethernet NDD supports 802.3 it should use a type of NDD_IS088023. Otherwise it should be NDD_ETHER. See sys/ndd.h for a list of possible values.
ndd_addrlen
    This field contains the length in bytes of physical address. For example, this would be 6 for ethernet.
ndd_hdrlen
    The total length in bytes of media and link level headers for this NDD. If headers are of variable length, the maximum length should be specified.
ndd_physaddr
    A pointer to the physical address of this device.
ndd_genstats
    The ndd_genstats structure contains simple counters that are common to all NDD types.
ndd_specstats
    A pointer to NDD specific counters, If there are no device specific counters this field may be NULL.
ndd_speclen
    Length of device specific statistics pointed to by ndd_specstats,
ndd_demuxer
    This field points to the network demuxer (struct ns_demuxer) associated with the NDD, If NULL at the time of the first ns_alloc, this field is initialized by Network Services. Otherwise the specified demuxer is used,
ndd_nsdemux
    If common demuxer services are used by the demuxer associated with the NDD, this field points to a demuxer control structure, Network Services will initialize this field.
ndd_specdemux
    A demuxer may initialize and use this field to point to a per NDD demuxer structure.

DESCRIPTION

The ndd structure defines a Network Device Driver and provides a linkage between a NDD and it's users, Each network device will have a ndd structure associated with it,

NOTES

The ndd structure is allocated and owned by the NDD. It must be pinned

FILES sys/ndd.h

NAME ndd_genstats
    Defines common NDD statistics

SYNOPSIS

```
#include <sys/ndd.h>
struct ndd_genstats {
    u_long   ndd_ipackets_msw;
    u_long   ndd_ipackets_lsw;
    u_long   ndd_ibytes_msw;
    u_long   ndd_ibytes_lsw;
    u_long   ndd_recvintr_msw;
    u_long   ndd_recvintr_lsw;
    u_long   ndd_ierrors;
    u_long   ndd_opackets_msw;
    u_long   ndd_opackets_lsw;
    u_long   ndd_obytes_msw;
    u_long   ndd_obytes_lsw;
    u_long   ndd_xmitintr_msw;
    u_long   ndd_xmitintr_lsw;
    u_long   ndd_oerrors;
    u_long   ndd_nobufs;
    u_long   ndd_xmitque_max;
    u_long   ndd_xmitque_ovf; /*XXX - Paul */
};
```

FIELDS ndd_ipackets_msw
    Most significant word of the number of packets received on this NDD.
ndd_ipackets_lsw
    Least significant word of the number of packets received on this NDD.
ndd_ibytes_msw
    Most significant word of the total received bytes.
ndd_ibytes_lsw
    Least significant word of the total received bytes.
ndd_ierrors
    Number of receive errors encountered.
ndd_opackets_msw
    Most significant word of the number of packets transmitted on this NDD.
ndd_opackets_lsw
    Least significant word of the number of packets transmitted on this NDD.
ndd_obytes_msw
    Most significant word of the number of transmitted bytes.
ndd_obytes_lsw
    Least significant word of the number of transmitted bytes.
ndd_oerrors
    Number of output errors for this NDD.
ndd_xmitintr_msw Most significant word of the count of transmit complete interrupts.
ndd_xmitintr_lsw
   Least significant word of the count of transmit complete interrupts.
ndd_recvintr_msw
   Most significant word of the count of receive data interrupts.
ndd_recvintr_lsw
   Least significant word of the count of receive data interrupts.
ndd_nobufs
   Number of times that buffers were not available.
ndd_xmitque_max
   Maximum number of transmits ever queued.
ndd_xmitque_ovf
   Number of transmit queue overflow errors.

DESCRIPTION

The ndd_genstats structure is used to keep simple counters that are common to all NDD types.

NOTES

The ndd_genstats structure is part of the ndd structure.

FILES sys/ndd.h

NAME ndd_statblk
   Network Device Driver status block.

| SYNOPSIS |
|---|
| #include <sys/ndd.h><br>struct ndd_statblk {<br>    u_int    code;<br>    u_int    option[10];<br>}; |

FIELDS code
   Defines the type of status block. Possible code values are in sys/ndd.h
NDD_HARD FAIL
   A hardware failure has occurred
NDD_LIMBO_ENTER
   Entered Network Recovery Mode
NDD_LIMBO_EXIT
   Exited Network Recovery Mode
NDD_STATUS
   Various status and event info option
   This field can contain reason codes and/or other information. The option field format is specified on a per code basis,
NDD_ADAP_CHECK
   Adapter checkstop condition NDD_BUS_ERROR
   Bus error
NDD_CMD_FAIL
   A device command has failed NDD_PIO_FAIL
   A PIO operation has failed NDD_UCODE_FAIL
   Failure of device microcode NDD_TX_ERROR
   A transmission error has occurred NDD_TX_TIMEOUT
   Transmission timeout error NDD_RCV_ERROR
   A receive error has occurred NDD_AUTO_RMV
   Auto-remove error detected NDD_CONNECTED
   Device open successful NDD_BAD_PKTS
   A bad packet was received

DESCRIPTION

This structure is used to convey asynchronous device status information to CDLI users.

FILES sys/ndd.h

NAME ns_user
   Describes user characteristics for delivering input packets.

| SYNOPSIS |
|---|
| #include <sys/cdli.h><br>#include <net/if.h><br>struct ns_user {<br>    int                (*isr) ( );<br>    caddr_t        isr_data;<br>    struct ifqueue  *protoq;<br>    u_short        pkt_format;<br>    u_short        netisr;<br>    struct ifnet    *ifp;<br>}; |

FIELDS isr
   Address of a function that handles input packets. The function will be called when there is receive data available that matches a user specified filter.
isr_data
   If the protoq parameter is NULL, this field will be passed to isr as a parameter.
protoq
   The address of an input ifqueue. If this field is non-NULL, input packets will enqueued and the isr will be scheduled with schednetisr(netisr). If it is NULL, the isr will called directly as such:
   . isr(nddp, m, macp, isr_data);
   where:
      nddp is the ndd structure from which the data originated.
      m is the input packet.
      macp points to the start of the packet.
      isr_data is the value specified in the
      ns_add_filter call.
pkt_format
   This field specifies the packet header presentation of input packets. Possible values are:
NS_PROTO
   Remove all link-level headers. SNAP is not used.
NS_PROTO_SNAP
   Remove all link-level headers including SNAP.
NS_INCLUDE_LLC
   Leave LLC headers in place.
NS_INCLUDE_MAC
   Do not remove any headers.
NS_HANDLE_NON_UI
   Automatically handle XID and TEST frames.

netisr

This field indicates a netisr number that will be used to schedule the users isr function. If netisr is non-zero, then the protoq must all be specified and the user must call the netisr_add service to register the netisr.

ifp

If the caller is an IFNET driver, this field should be set to the appropriate ifnet pointer. The field should be NULL if the caller is not an IFNET driver.

DESCRIPTION

This structure is used to describe how packets are to be delivered to a user of a demuxer. The user initializes this structure before calling the ns_add_filter service.

FILES sys/cdli.h

NAME ns_statuser
Describes an asynchronous status user of a device.

SYNOPSIS

```
struct ns_statuser
    int      (*isr) ( );
    caddr_t  isr_data;
};
```

FIELDS isr

Address of a function that handles asynchronous status. The function will be called when an asynchronous status event occurs. The isr will called directly as such:

isr(nddp, status, isr_data);

where:

nddp is the ndd structure from which the status originated.

status is a pointer to a ndd_statblk structure.

isr_data is the value specified in the ns_add_status call.

isr_data

This field will be passed to isr as a parameter.

DESCRIPTION

This structure is used to describe a status user. It is used to present asynchronous status when it occurs.

FILES sys/cdli.h

NAME ns_8022

802.2 LLC receive filter used by common demuxer services.

SYNOPSIS

```
struct ns_8022 {
    u_int    filtertype;
    u_char   dsap;
    u_char   orgcode [3];
    u_short  ethertype;
```

SYNOPSIS

```
};
```

FIELDS filtertype

Specifies the type of receive filtering. One of:

NS_8022_LLC_DSAP filter on 802.2 DSAP field

NS_8022_LLC_DSAP_SNAP filter on 802.2 with SNAP

NS_TAP

Receive all network packets from a NDD.

NS_TAP users cannot specify to have packets queued, they are called directly and must copy the packet if they are interested in it.

dsap

The 802.2 LLC DSAP on which to filter.

orgcode

Specifies the organization code in the 802.2 SNAP header. This field is only valid if filtertype is set to NS_8022_LLC_DSAP_SNAP.

ethertype

Specifies the ethertype field in the 802.2 SNAP header. This field is only valid if filtertype is set to NS_8022_LLC_DSAP_SNAP.

DESCRIPTION

This structure is the receive filter that is used by the Common Demuxer Services. It allows filtering on networks that use 802.2 LLC for protocol multiplexing.

FILES sys/cdli.h

NAME ns_comstatus
Status filter for Common Demuxer Services

SYNOPSIS

```
struct ns_comstatus {
    u_int    filtertype;
    u_int    mask;
    u_int    sid;
};
```

FIELDS filtertype

Specifies the type of status filter. It should be set to NS_STATUS_MASK.

mask

The status code mask value. When an asynchronous event has occurred on a device, the Network Demuxer will logical AND the specified mask field with the status block's code field. If the result is non-zero the status block will be delivered to the user.

sid

This field holds the status id that is calculated by the ns_add_status service. The user must keep track of this value and provide it to the ns_del_status service.

DESCRIPTION

This structure is the status filter that is used by the Common Demuxer services. It provides a user with a means of specifying which status events are of interest.

FILES sys/cdli.h

NAME ifqueue
  Network packet queue.

SYNOPSIS

```
struct ifqueue {
        struct mbuf    *ifq_head;
        struct mbuf    *ifq_tail;
        int     ifq_len;
        int     ifq_maxlen;
        int     ifq_drops;
};
```

FIELDS ifq_head
  Pointer to the first mbuf in the queue.
ifq_tail
  Pointer to the last mbuf in the queue.
ifq_len
  The number of packets in the queue.
ifq_maxlen
  Maximum number of packets than can be queued on this queue.
ifq_drops
  Number of packets dropped because the queue was full.

DESCRIPTION

This structure is used to queue network packets for CDLI users that have requested queued service. Macros for manipulating ifqueues may be found in net/if.h. Packets are enqueued FIFO. The m_nextpkt field of a mbuf is used as the queueing mechanism. Packets may be removed one at a time by using the IF-DEQUEUE macro.

FILED net/if.h

NAME nd_dmxstats
  Network Demuxer statistics.

SYNOPSIS

```
struct nd_dmxstats {
        u_long    nd_nofilter;
        u_long    nd_nobufs;
        u_long    nd_bcast;
        u_long    nd_mcast;
};
```

FIELDS nd_nofilter
  The number of packets dropped due to no user.
nd_nobufs
  The number of packets dropped because buffers were unavailable.
nd_bcast
  Number of broadcast packets received.
nd_mcast
  Number of multicast packets received.

DESCRIPTION

This structure contains statistics that are independent of demuxer type. The statistics provide usage and diagnostic counters.

FILES sys/cdli.h

NAME ns_demuxer
  Defines a Network Demuxer.

SYNOPSIS

```
struct ns_demuxer {
        u_short   inuse;
        u_short   use_nsdmx;
        int       (*add_filter) ( );
        int       (*del_filter) ( );
        int       (*add_status) ( );
        int       (*del_status) ( );
        int       (*receive) ( );
        int       (*status) ( );
        int       (*response) ( );
};
```

FIELDS inuse
  Indicates if a demuxer is currently being used. This field is only set by network services. It is incremented for each ns_alloc and decremented for each ns_free.
use_nsdmx
  This field is a boolean variable that should be set to TRUE if the demuxer is going to use the common demuxer services provided by CDLI. If the common services are not used, the vaslue should be FALSE.
add_filter
  The address of the add filter function of the demuxer. This function will be called from the ns_add_filter network service.
del_filter
  The address of the delete filter function of the demuxer. This function will be called from the ns_del_filter network service,
add_status
  The address of the add status function of the demuxer. This function will be called from the ns_add_status network service.
del_status
  The address of the delete status function of the demuxer. This function will be called from the ns_del status network service,
receive
  The address of the packet input function of a demuxer. A NDD will call this function when receive data is available.
status The address of the status processing function of a demuxer. A NDD will call this function when asynchronous status has occurred.
response
The address of a function that will be called when a XID or TEST frame response is required.

DESCRIPTION

This structure is used to register a Network Demuxer through the ns_add_demux service. It specifies the various entry points of a demuxer.

FILES sys/cdli.h

NAME nd_config
Provides Network Demuxer configuration information.

SYNOPSIS

```
#include <sys/cdli.h>
struct nd_config {
    int     version;
    int     errcode;
    int     ndd_type;
};
```

FIELDS version
The version number of the nd_config structure. Set to ND_CONFIG_VERSION_1.
errcode
Return status from the demuxer configuration.
ndd_type
Specifies the type of NDD this demuxer serves.

DESCRIPTION

This structure is used to convey configuration information to a Network Demuxer.

FILES sys/cdli.h

To summarize, a uniform interface is provided that allows for enabling multiple data frameworks through the use of a single hardware adapter. This greatly simplifies operating system portability to various hardware platforms, as well as minimizing hardware adapter requirements to provide such multiple framework support.

It will be understood that the preferred embodiment herein presented is for illustrative purposes and, as such, will not be construed to place a limitation on the invention. Those skilled in the art will understand that changes in form and detail of the preferred embodiment herein disclosed may be made without departing from the spirit and scope of the claimed invention.

We claim:

1. A computer implemented method for exchanging data packets having end user data and protocol encapsulation data, between a plurality of software entities that send and receive the data packets in diverse formats, and at least one device of a particular device type, wherein the method is independent of operating system type and device type, comprising the steps of:

(a) registering the device and a demuxer corresponding to the device with network services;

(b) allocating use of the device by a first software entity with the network services;

(c) returning by the network services a handle to the first software entity defining a path from the first software entity to the device, thereby defining the path for directly transmitting at least one data packet from the first software entity to the device;

(d) registering by the first software entity a filter with the demuxer, the filter for identifying data packets belonging to the first software entity and received by the demuxer from the device;

(e) repeating steps (a) through (d) for each of the plurality of software entities;

(f) receiving at least one data packet by the demuxer from the device, whereby the demuxer forwards the received data packet from the device to the appropriate software entity without modifying the data packet based on a match of a portion of the data packet with the filter; and wherein the device comprises an adapter and a corresponding device driver;

wherein the adapter comprises an ethernet, token ring, FDDI, FSC, SCSI, or ATM adapter; and wherein each of the software entities comprise TCP/IP, IPX, SPX, NetBios, OSI, SNA, or SCSI formats.

2. A computer system for exchanging at least one data packet having end user data and protocol encapsulation data between a plurality of software entities that send and receive the data packets in diverse formats, and at least one device of a particular device type, comprising:

(a) network services for registering the device and a demuxer corresponding to the device;

(b) the network services for allocating use of the device by a first software entity;

(c) the network services for returning a handle to the first software entity defining a path from the first software entity to the device, thereby defining the path for directly transmitting at least one data packet from the first software entity to the device;

(d) the first software entity for registering a filter with the demuxer, the filter for identifying data packets belonging to the first software entity and received by the demuxer from the device;

(e) the demuxer for receiving at least one data packet from the device, whereby the demuxer forwards the received data packet from the device to the appropriate software entity without modifying the data packet based on a match of a portion of the data packet with the filter; and wherein the device comprises an adapter and a corresponding device driver;

wherein the adapter comprises an ethernet, token ring, FDDI, FCS, SCSI, or ATM adapter; and wherein each of the software entities comprises TCP/IP, IPX, SPX, NetBios, OSI, SNA, or SCSI formats.

* * * * *